US008750886B2

(12) United States Patent
Hakola et al.

(10) Patent No.: US 8,750,886 B2
(45) Date of Patent: Jun. 10, 2014

(54) APPARATUS AND METHOD FOR DYNAMIC RESOLUTION OF SECONDARY COMMUNICATION SYSTEM RESOURCES

(75) Inventors: Sami-Jukka Hakola, Oulu (FI); Timo K. Koskela, Oulu (FI); Matti Pikkarainen, Oulu (FI)

(73) Assignee: Nokia Corporation, Espoo (FI)

( * ) Notice: Subject to any disclaimer, the term of this patent is extended or adjusted under 35 U.S.C. 154(b) by 481 days.

(21) Appl. No.: 12/775,243

(22) Filed: May 6, 2010

(65) Prior Publication Data

US 2011/0275379 A1     Nov. 10, 2011

(51) Int. Cl.
*H04W 72/00* (2009.01)
(52) U.S. Cl.
USPC ......... 455/450; 455/509; 455/451; 455/452.1
(58) Field of Classification Search
USPC .............................. 455/509, 450–451, 452.1
See application file for complete search history.

(56) References Cited

U.S. PATENT DOCUMENTS

| | | | | |
|---|---|---|---|---|
| 5,506,867 | A * | 4/1996 | Kotzin et al. | 375/220 |
| 5,682,419 | A * | 10/1997 | Grube et al. | 455/450 |
| 8,040,815 | B2 * | 10/2011 | Silk et al. | 370/252 |
| 2007/0117537 | A1 * | 5/2007 | Hui et al. | 455/405 |
| 2008/0056183 | A1 | 3/2008 | Gorokhov et al. | |
| 2009/0149208 | A1 * | 6/2009 | Huttunen et al. | 455/509 |
| 2009/0268645 | A1 | 10/2009 | Chindapol et al. | |
| 2011/0053604 | A1 * | 3/2011 | Kim et al. | 455/450 |
| 2011/0165903 | A1 * | 7/2011 | Selen et al. | 455/509 |
| 2011/0194485 | A1 * | 8/2011 | Horneman et al. | 370/315 |
| 2011/0255425 | A1 | 10/2011 | Pikkarainen et al. | 370/252 |

FOREIGN PATENT DOCUMENTS

| | | |
|---|---|---|
| WO | WO 2009 130592 A1 | 10/2009 |
| WO | WO 2010 027308 A1 | 3/2010 |

OTHER PUBLICATIONS

3GPP TS 32.781 V9.1.0 (Mar. 2010), Technical Specification, 3rd Generation Partnership Project; Technical Specification Group Services and System Aspects; Telecommunication Management; Home Enhanced Node B (HeNB) Subsystem (HeNS); Network Resource Model (NRM); Integration Reference Point (IRP); Requirements (Release 9), (9 pages).
3GPP TS 36.300 V8.7.0 (Dec. 2008). Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8), (144 pages).
3GPP TS 36.331 V9.1.0 (Dec. 2009), Technical Specification, 3rd Generation Partnership Project; Technical Specification Group Radio Access Network; Evolved Universal Terrestrial Radio Access (E-UTRA) Radio Resource Control (RRC); Protocol Specification, (Release 9), (233 pages).

(Continued)

*Primary Examiner* — Charles Shedrick
(74) *Attorney, Agent, or Firm* — Harrington & Smith

(57) ABSTRACT

An apparatus, method and system for dynamic resolution of secondary communication system resources for communications in a communication system. In one embodiment, an apparatus includes a processor and memory including computer program code. The memory and the computer program code are configured to, with the processor, cause the apparatus to receive an allocation of secondary communication system resources on a control channel of a primary communication system to enable communication in a secondary communication system. The secondary communication system resources are a function of unused primary communication system resources in the primary communication system.

16 Claims, 10 Drawing Sheets

(56) References Cited

OTHER PUBLICATIONS

NEC Group, NTT DoCoMo, "Uplink Resource Allocation for E-UTRA," 3GPP document, TSG-RAN WG1 Meeting #46bis, R1-062773, Aug. 9-13, 2006, Seoul, Korea, 10 pages.

Huawei, "Opportunities for Energy Savings in LTE Networks," 3GPP document, TSG RAN WG1 Meeting #59bis, R1-100275, Jan. 18-22, 2010, Valencia, Spain, 4 pages.

NTT DoCoMo, "Energy saving at eNB," 3GPP document, TSG RAN WG1 Meeting #59bis, R1-100298, Jan. 18-22, 2010, Valencia, Spain, 2 pages.

3GPP TS 25.331 V9.1.0 (Dec. 2009), Technical Specification, $3^{rd}$ Generation Partnership Project; Technical Specification Group Radio Access Network; Radio Resource Control (RRC); Protocol Specification (Release 9), (1759 pages).

* cited by examiner

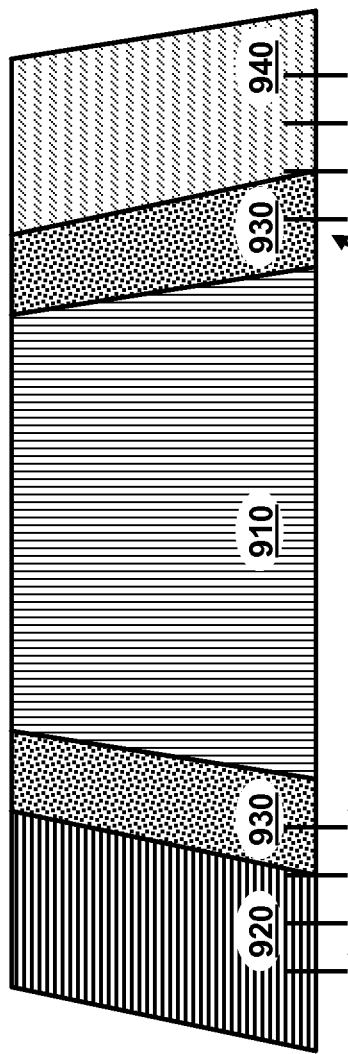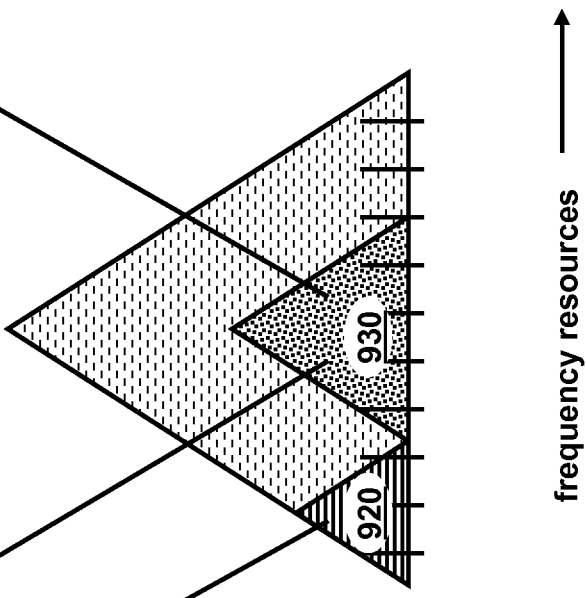
FIGURE 9A
FIGURE 9B

APPARATUS AND METHOD FOR DYNAMIC RESOLUTION OF SECONDARY COMMUNICATION SYSTEM RESOURCES

TECHNICAL FIELD

The present invention is directed, in general, to communication systems and, in particular, to an apparatus, method and system for dynamic resolution of secondary communication system resources for communications in a communication system.

BACKGROUND

Long term evolution ("LTE") of the Third Generation Partnership Project ("3GPP"), also referred to as 3GPP LTE, refers to research and development involving the 3GPP LTE Release 8 and beyond, which is the name generally used to describe an ongoing effort across the industry aimed at identifying technologies and capabilities that can improve systems such as the universal mobile telecommunication system ("UMTS"). The notation "LTE-A" is generally used in the industry to refer to further advancements in LTE. The goals of this broadly based project include improving communication efficiency, lowering costs, improving services, making use of new spectrum opportunities, and achieving better integration with other open standards. The 3GPP LTE project produces new standards as well as standards recommendations for the UMTS.

The evolved universal terrestrial radio access network ("E-UTRAN") in 3GPP includes base stations providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment (also referred to as "UE"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the radio resource control management, see 3GPP TS 25.331 v.9.1.0 (2009-12) and 3 GPP TS 36.331 v.9.1.0 (2009-12), which are incorporated herein by reference.

As wireless communication systems such as cellular telephone, satellite, and microwave communication systems become widely deployed and continue to attract a growing number of users, there is a pressing need to accommodate a large and variable number of communication devices transmitting a growing range of communication applications with fixed communication resources, and a growing need to conserve energy in base stations and wireless communication devices. A current topic in 3GPP of general interest is saving of energy in the cellular network. Integration of new network topologies into cellular networks has also attracted a high level of attention and interest both in industrial and academic circles. An example of a current study item in LTE/LTE-A related to heterogeneous cellular networks is deployment of macro, micro, pico, and femto base stations as well as relays in the same spectrum. A step in network integration is allowing local communication for devices (e.g., wireless communication devices or machines such as televisions and appliances) in the same communication system such as a cellular communication system when the devices are sufficiently close or are otherwise capable of using radio communication system resources in an efficient manner.

The processes to allow base stations to save power have been broadly discussed in 3GPP working groups. One technique is to scale the used effective bandwidth in a cell according to a load level. Another technique is to narrow the communication system bandwidth possibly turn off extra bands and carriers in LTE-A based communication systems or networks to obtain possible energy savings. One of the proposed techniques is to allow a base station to dynamically adjust its used communication system bandwidth in one carrier according to its load level. Dynamically adjusting used communication system bandwidth may be more attractive than saving power in the time domain due to the continuous need to transmit synchronization signals across the used communication system bandwidth.

Cellular and related communication systems can be described as employing primary and secondary communication system resources. Primary communication system resources (e.g., bandwidth) relate to used bandwidth in a primary communication system. For example, during light communication system utilization, a base station may utilize only a portion of its communication system bandwidth. The utilized portion of the communication system bandwidth would dynamically vary with communication system loading. Primary communication system resources are employed by a base station for a device (e.g., a wireless communication device) to communicate with another end device, with the base station acting as an intermediary node in the communication path.

Secondary communication system resources relate to the unused bandwidth in the primary communication system. The secondary communication system resources can be assigned by a base station to the secondary communication system to facilitate communications therein such as for device-to-device ("D2D") or machine-to-machine ("M2M") communication. Also, the secondary communication system may include, without limitation, a television, appliance (e.g., a refrigerator) or utility meter (for remote sensing/reading) configured to communication wirelessly with a user equipment or home base station.

The secondary communication system usage in future communication systems or networks is thus related to opportunistic usage of radio communication system resources and spectrum of the primary communication system or cognitive radio operation, wherein the primary communication system may be a LTE-A cellular network. A secondary communication system may utilize the spectrum of a primary communication system opportunistically if the secondary communication system does not degrade performance or otherwise interfere with the primary communication system.

For example, devices in the secondary communication system may be wireless communication devices that have an operator's subscriber identity module ("SIM") card that provides authentication of such devices to the communication system or network. To allow local machine-to-machine or sensor communication, it may be feasible that these entities may use spectrum without a need for signaling towards the radio access network. Such operation in future cellular networks without an intermediary base station could save a substantial amount of energy and prevent extensive and otherwise unnecessary signaling load such as control and user plane signaling and scheduling between a base station and a number of devices (or machines). A present concern with device-to-device and machine-to-machine communication is how UTRAN/E-UTRAN can handle the number of future devices and machines compared to the number of normal cellular devices. Secondary usage is also referred to as future cognitive radios.

Integrating device-to-device or machine-to-machine communication into a cellular communication system introduces a number of challenges. One of the more problematic issues is how to perform communication system resource allocation among devices from the pool of primary communication system resources. In the case where the load in a cell due to cellular communication mode devices is lower than the current bandwidth allocation that would be provided for the carrier, the base station may decrease the used carrier bandwidth. Thus, there is a possibility to assign primary communication resources (e.g., frequency resources) outside the bandwidth used for the devices in the primary communication system that are still within the maximum allowed bandwidth of the primary communication system.

An unsolved problem is how a base station assigns and signals such secondary communication system resources that are not within the effective bandwidth, but within the maximum allowed bandwidth of the primary communication system. Another problem is how to use the same communication system resource allocation signaling in the cell when the ratio of used and unused bandwidth of the primary communication system changes. In view of the growing deployment of communication systems such as cellular communication systems, it would be beneficial for the purpose of enabling more efficient utilization of communication resources by the network to allocate secondary communication resources to facilitate communications in a secondary communication system that avoids the deficiencies of known communication systems for allocation of such resources.

SUMMARY OF THE INVENTION

These and other problems are generally solved or circumvented, and technical advantages are generally achieved, by embodiments of the present invention, which include an apparatus, method and system for dynamic resolution of secondary communication system resources for communications in a communication system. In one embodiment, an apparatus includes a processor and memory including computer program code. The memory and the computer program code are configured to, with the processor, cause the apparatus to receive an allocation of secondary communication system resources on a control channel of a primary communication system to enable communication in a secondary communication system. The secondary communication system resources are a function of unused primary communication system resources in the primary communication system.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which:

FIGS. 9A-9B illustrate graphical representations of an embodiment of a communication system resource allocation tree for secondary communication system resources in accordance with the principles of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, method and system for dynamic resolution of secondary communication system resources for communications in a communication system. The apparatus, method and system are applicable, without limitation, to any communication system including existing and future 3GPP technologies (i.e., UMTS, LTE, and its future variants such as 4th generation ("4G") communication systems).

Figure 1:
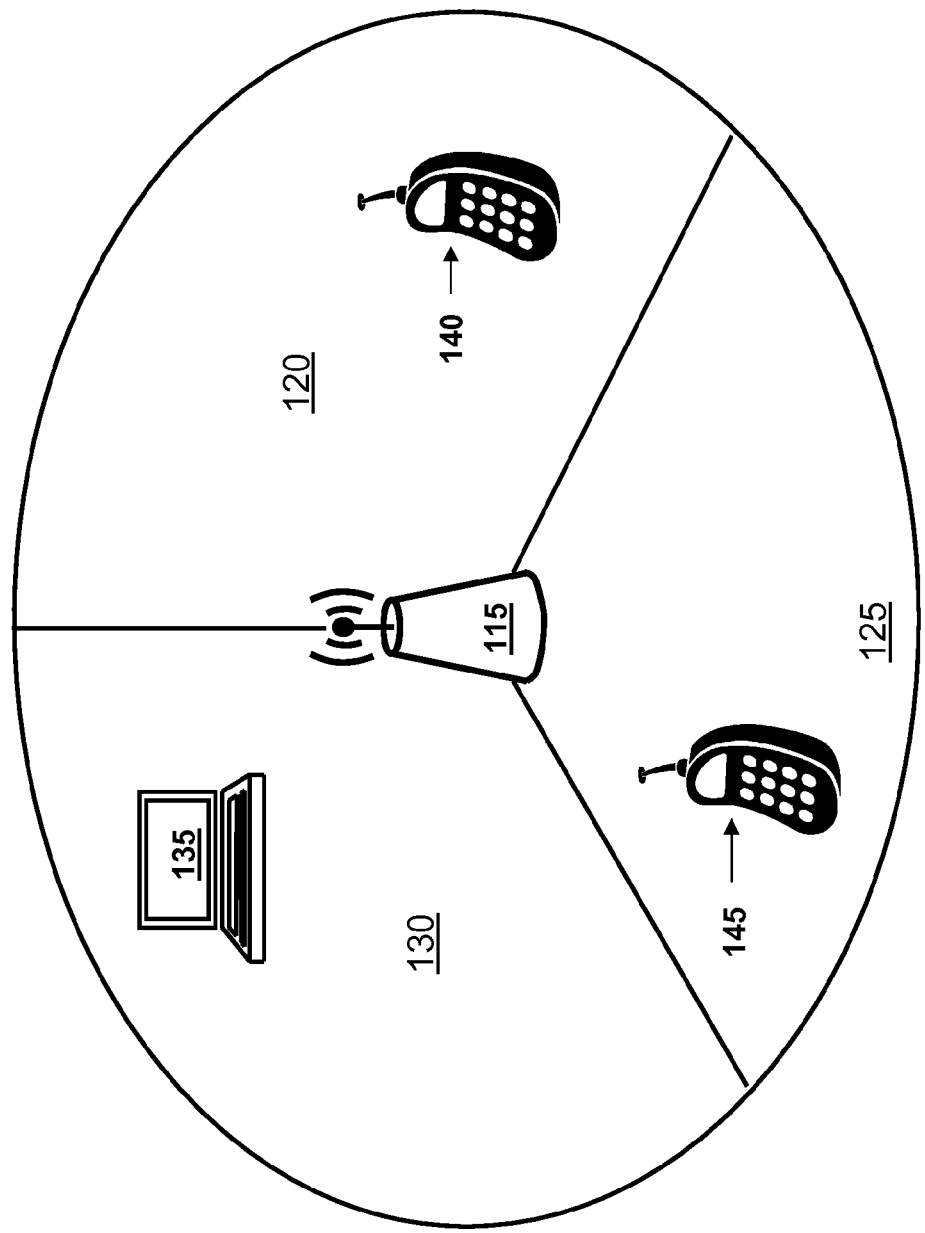
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to cooperative multiple-input multiple-output ("C-MIMO") operation, etc. The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, device-to-device and machine-to-machine communications or other communications as described herein or introduced in the future.

Figure 2:
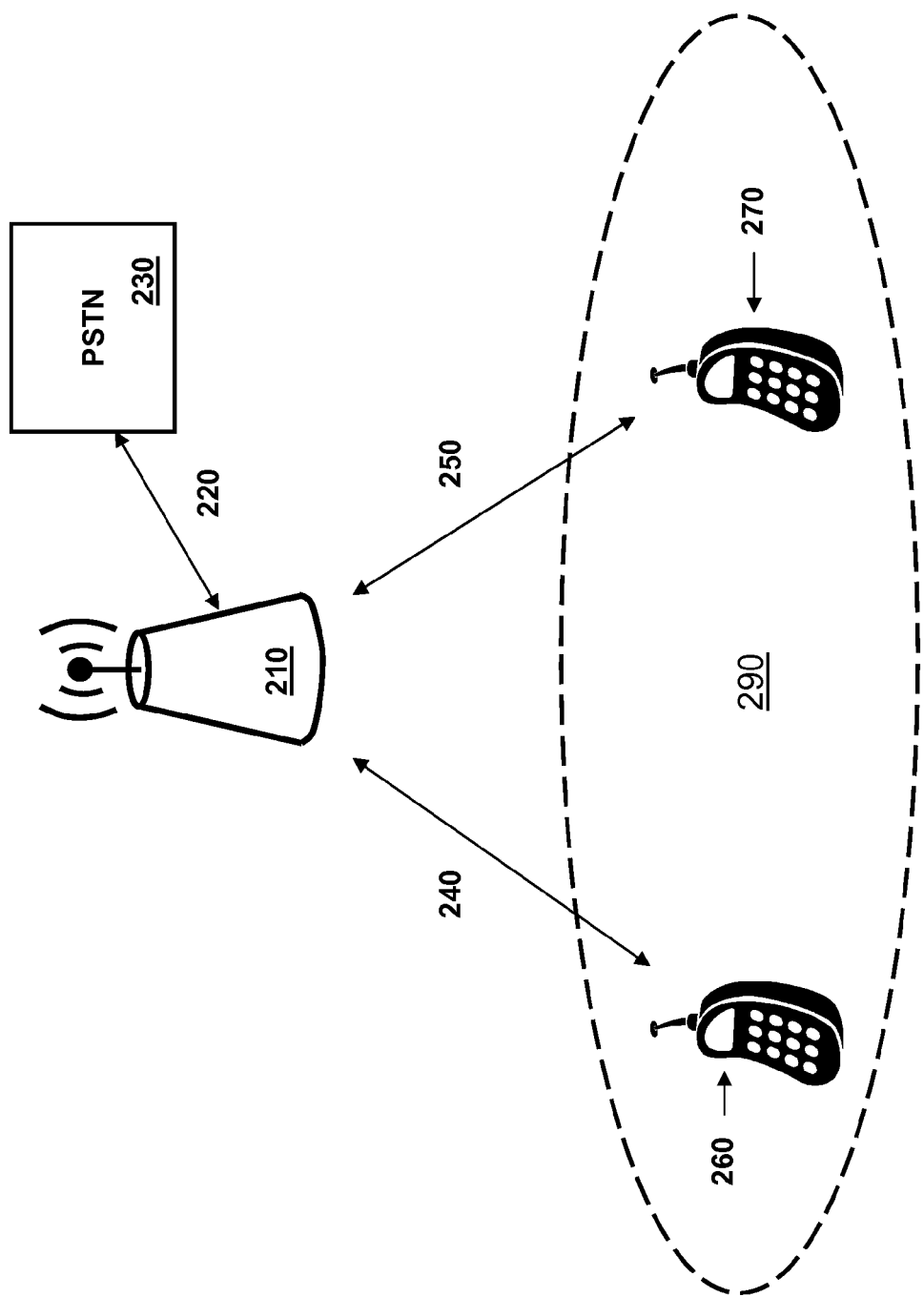

Turning now to FIG. 2, illustrated is a system level diagram of an embodiment of a communication system including wireless communication devices that provides an environment for application of the principles of the present invention. The communication system includes a base station 210 coupled by communication path or link 220 (e.g., by a fiber-optic communication path) to a core telecommunications network such as public switched telephone network ("PSTN") 230. The base station 210 is coupled by wireless communication paths or links 240, 250 to wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications as described herein or introduced in the future.

Figure 3:
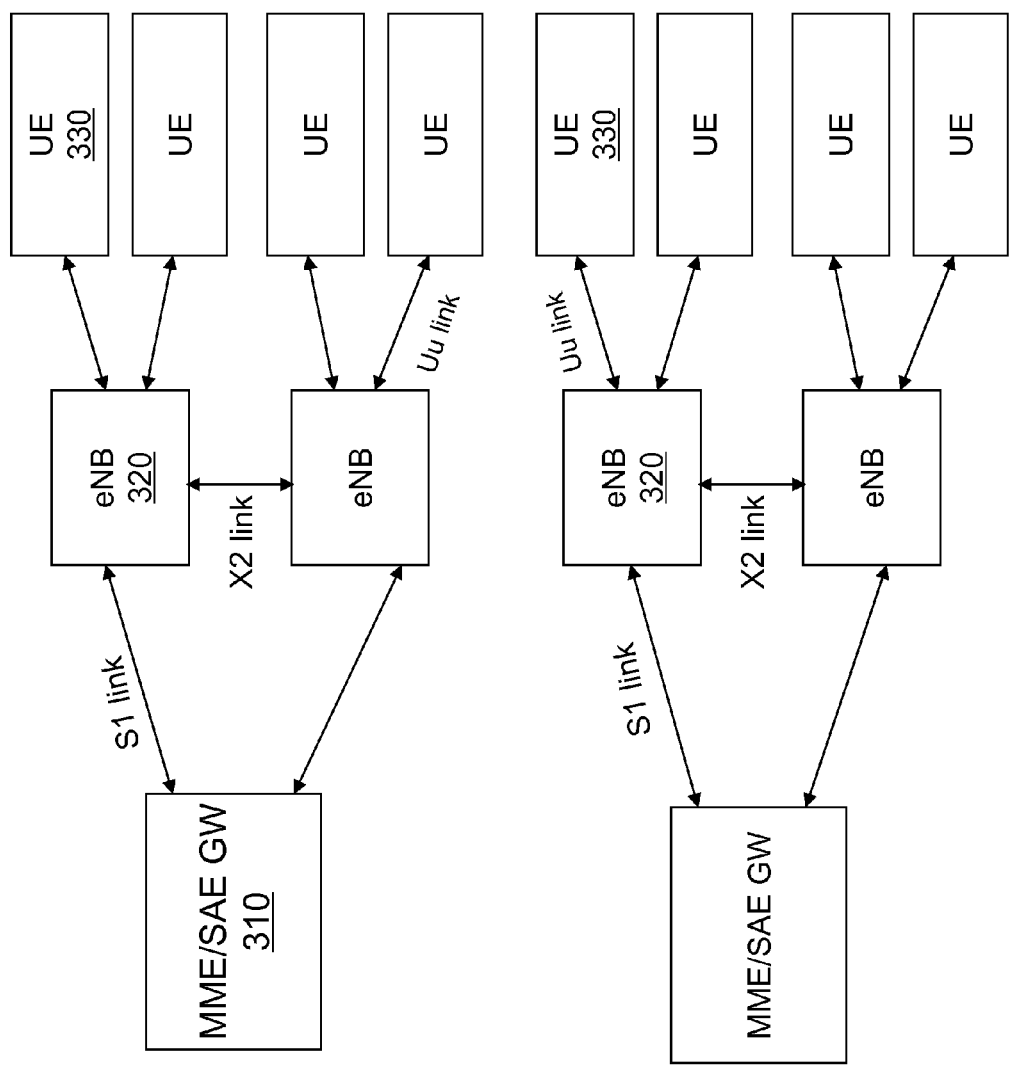
FIGS. 3 and 4 illustrate system level diagrams of embodiments of communication systems including a wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (ones of which are designated "X2 link"). The various communication links are typically fiber, microwave, or other high-frequency metallic communication paths such as coaxial links, or combinations thereof.

The base stations 320 communicate with user equipment ("UE," ones of which are designated 330), which is typically a mobile transceiver carried by a user. Thus, communication links (designated "Uu" communication links, ones of which are designated "Uu link") coupling the base stations 320 to the user equipment 330 are air links employing a wireless communication signal such as, for example, an orthogonal frequency division multiplex ("OFDM") signal. While the user equipment 330 are part of a primary communication system, the user equipment 330 and other devices such as machines (not shown) may be a part of a secondary communication system to participate in, without limitation, device-to-device and machine-to-machine communications or other communications as described herein or introduced in the future.

Figure 4:
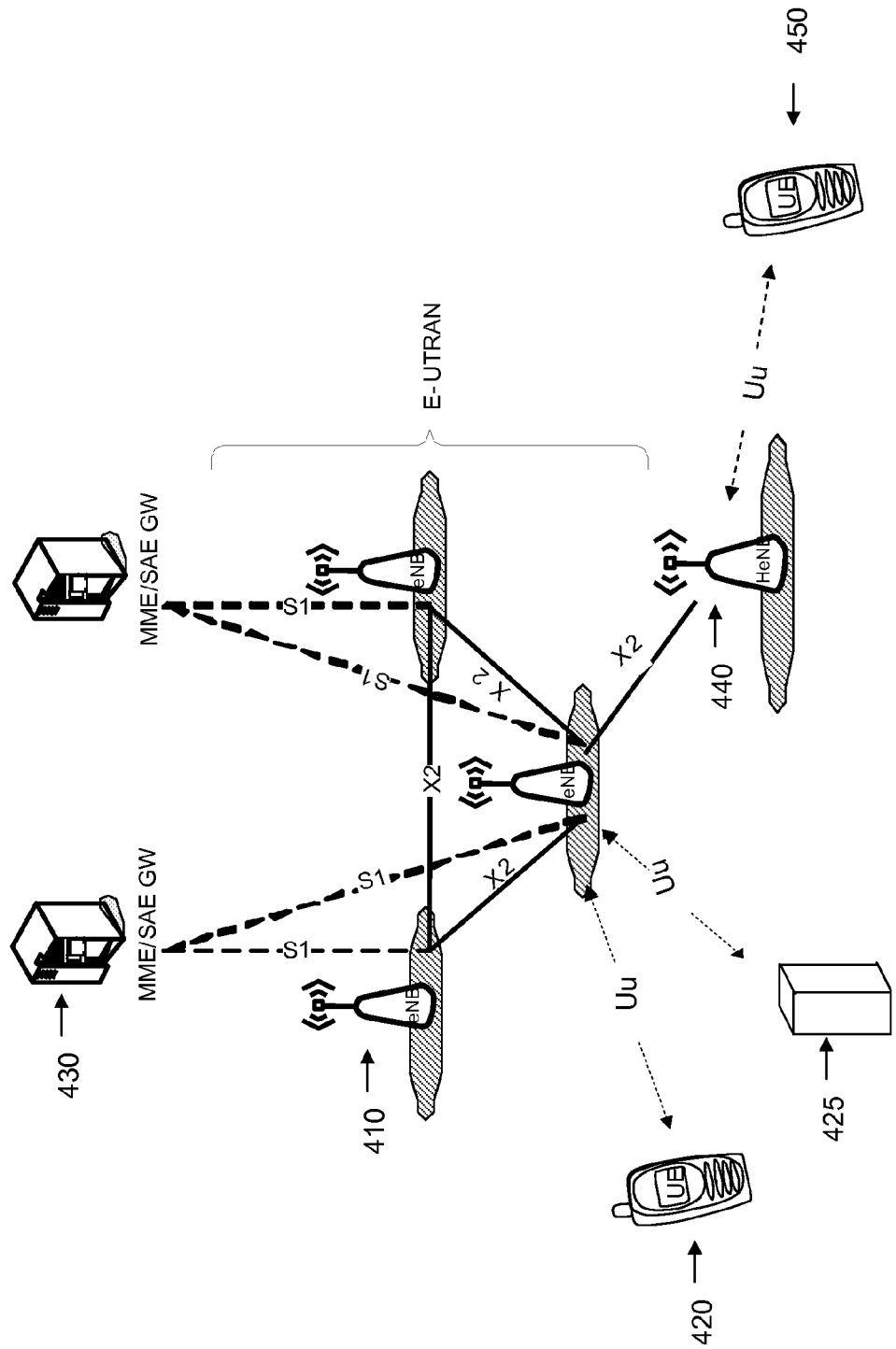

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards user equipment 420 and other devices such as machines 425 (e.g., an appliance, television, meter, etc.). The base stations 410 are interconnected with X2 interfaces or communication links (designated "X2"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of U-plane packets for paging reasons, switching of U-plane for support of the user equipment mobility, idle state mobility control, and system architecture evolution bearer control. The user equipment 420 and machines 425 receive an allocation of a group of information blocks from the base stations 410.

Additionally, the ones of the base stations 410 are coupled a home base station 440 (a device), which is coupled to devices such as user equipment 450 and/or machines (not shown) for a secondary communication system. The base station 410 can allocate secondary communication system resources directly to the user equipment 420 and machines 425, or to the home base station 440 for communications (e.g., local communications) within the secondary communication system. For a better understanding of home base stations (designated "HeNB"), see 3 GPP TS 32.871 v.9.1.0 (2010-03), which is incorporated herein by reference. While the user equipment 420 and machines 425 are part of a primary communication system, the user equipment 420, machines 425 and home base station 440 (communicating with other user equipment 450 and machines (not shown)) may be a part of a secondary communication system to participate in, without limitation, device-to-device and machine-to-machine communications or other communications as described herein or introduced in the future.

Figure 5:
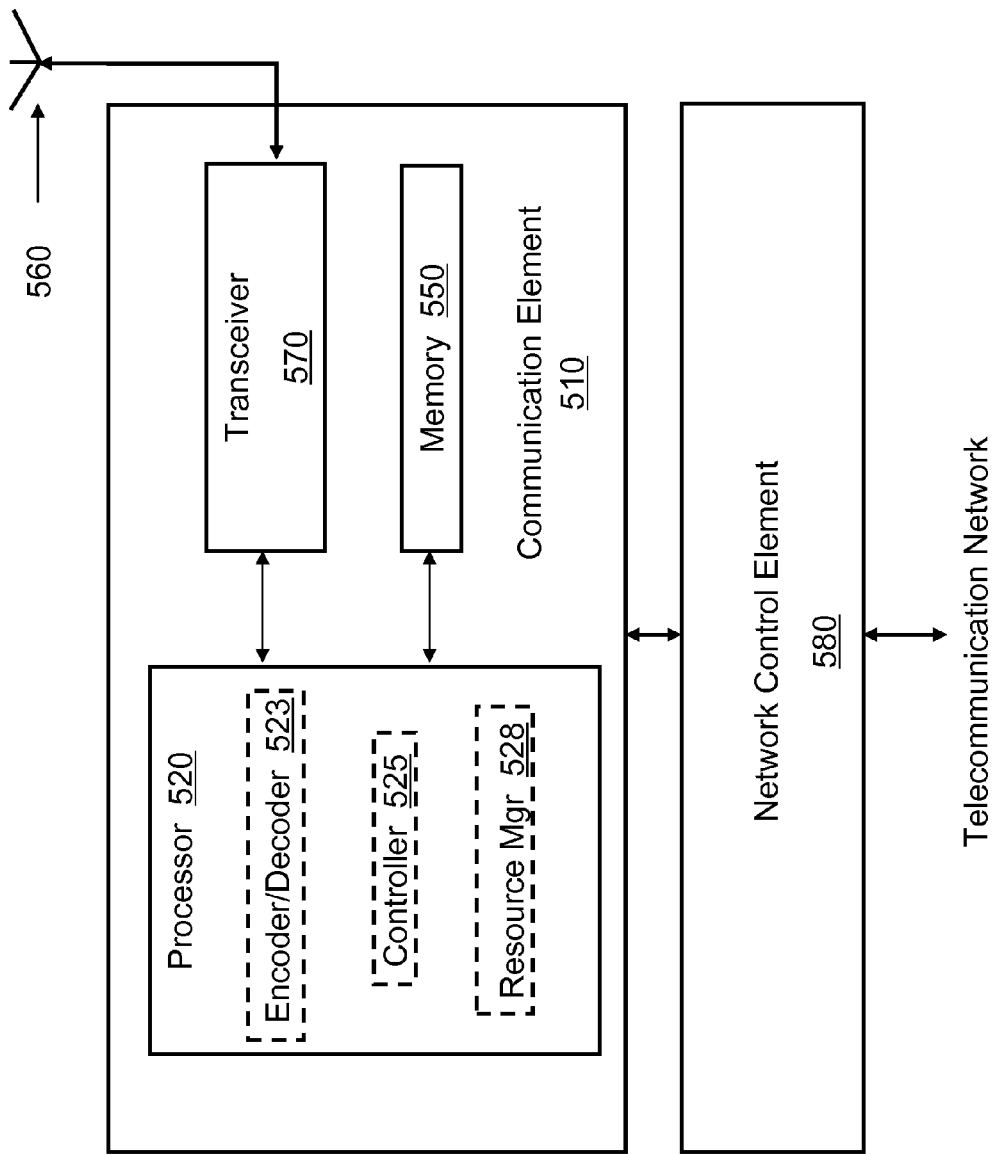
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, a wireless communication device (e.g., a subscriber station, terminal, mobile station, user equipment, machine), a network control element, a communication node, or the like. The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communication. The communication element 510 may provide point-to-point and/or point-to-multipoint communication services.

The communication element 510, such as a base station in a cellular network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communication, or similar link coupled to an appropriate link-terminating element. A communication element 510 formed as a wireless communication device is generally a self-contained device intended to be carried by an end user.

The processor 520 in the communication element 510, which may be implemented with one or a plurality of processing devices, performs functions associated with its operation including, without limitation, encoding and decoding (encoder/decoder 523) of individual bits forming a communication message, formatting of information, and overall control (controller 525) of the communication element, including processes related to management of communication resources (resource manager 528). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like. For instance, in accordance with the memory 550, the resource manager 528 is configured to allocate primary and second communication resources (e.g., time and frequency communication resources) for transmission of voice communications and data to/from the communication element 510 and to format messages including the communication resources therefor in a primary and secondary communication system.

The execution of all or portions of particular functions or processes related to management of communication resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna 560 to another communication element. The transceiver 570 demodulates information received via the antenna 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

As introduced herein, a base station allocates secondary communication system resources for communication in a secondary communication system by devices such as a home base station to devices or machines without further intervening control by the base station. The allocation of the secondary communication system is provided on a control channel (e.g., a physical downlink control channel ("PDCCH")) of a primary communication system according to the available (or unused) primary communication system resources (or bandwidth). The secondary communication system resources are allocated according to a communication system resource allocation method used by the primary communication system and may include guard bands. The allocation of the primary and secondary communication system resources may be equal and dynamically varies according to the unused primary communication system resources (or bandwidth). The primary and secondary communication system resources may be multiplexed on the control channel to the devices of the secondary communication system. The secondary communication system resources may be allocated to the device using a different radio network temporary identifier ("RNTI") than that used for allocation to the device for a primary communication system resource to identify the secondary communication system resources. The allocation can be tree-based, bitmap-based or made in any other suitable way.

In the current design of 3GPP LTE, in each subframe, PDCCHs indicate frequency domain communication system resource allocations. Communication system resource allocation types include both bitmap and tree-based methods. The number of bits employed in either method is a function of allocated bits in a downlink and uplink, $N_{RB}^{DL}$ and $N_{RB}^{UL}$, respectively. Both values are signaled in broadcast information transmitted across the cell.

In U.S. Patent Application Publication No. 2011/0255425, entitled "Method and Apparatus for Secondary Bandwidth Detection and Allocation," to Pikkarainen, et al., filed Apr. 15, 2010, which is incorporated herein by reference, network-assisted secondary communication system usage in future cellular communication systems is described. Pikkarainen, et al. describes, among other things, that the network indicates the available bandwidth for secondary communication system in a system information broadcast. Based on the information signaled by the base station, devices in the secondary communication system can identify resources of the primary communication system. Devices in the secondary communication system can then autonomously select suitable resources for transmission, etc. Also, 3GPP document TSG RAN WG1 Meeting #59bis, R1-100275, entitled "Opportunities for Energy Savings in LTE Networks" (2010) and 3GPP document TSG RAN WG1 Meeting #59bis, R1-100298, entitled "Energy Saving at eNB" (2010), which are incorporated herein by reference, describe techniques to scale or narrow the communication system bandwidth to obtain possible energy savings. The determination of available secondary communication system resources and obtaining energy savings in the communication system is an ongoing objective for such communication systems.

Figure 6:
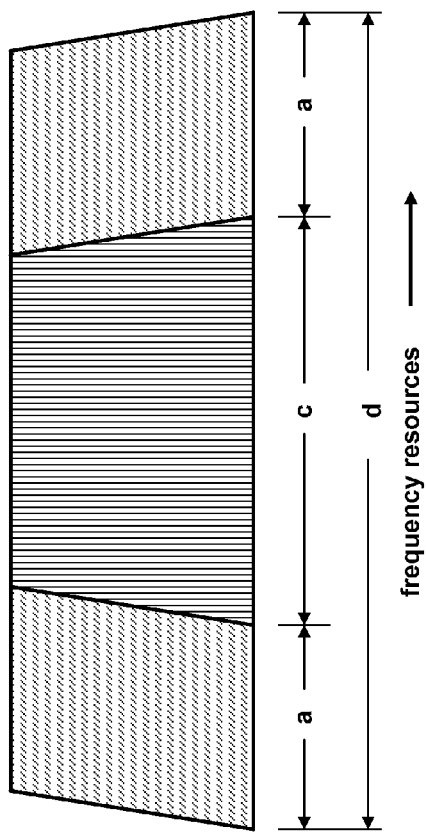
FIG. 6 illustrates a graphical representation demonstrating exemplary primary communication system resources for a primary communication system according to the principles of the present invention.

Turning now to FIG. 6, illustrated is a graphical representation demonstrating exemplary primary communication system resources for a primary communication system according to the principles of the present invention. The horizontal axis represents the primary communication system resources such as frequency resources (e.g., physical resource blocks ("PRBs") or subcarriers) and the vertical axis represents a general communication system parameter such as a transmitted power level. As illustrated in FIG. 6, the maximum allowed primary communication system resources (e.g., bandwidth) of the primary communication system is represented as the parameter "d." The used (active or deployed) bandwidth by the primary communication system is represented by the parameter "c." A user equipment can ascertain the used bandwidth from a master information block ("MIB") or a system information block ("SIB") transmitted by a base station in communication system such as an LTE-based communication system. The unused bandwidth at the edge of the maximum allowed bandwidth can be represented as the parameter "a." The network may signal the maximum allowed bandwidth in broadcast information or via dedicated signaling to devices, etc. in a secondary communication system.

Figure 7:
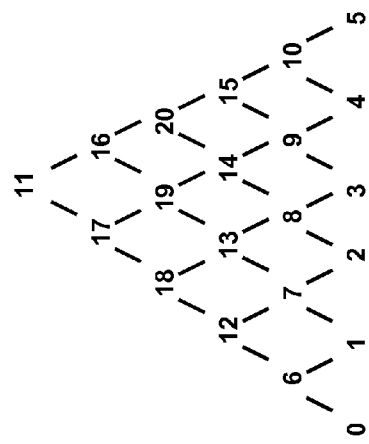
FIG. 7 illustrates a diagram of an exemplary tree structure for the allocation of communication system resources in accordance with the principles of the present embodiment.

Turning now to FIG. 7, illustrated is a diagram of an exemplary tree structure for the allocation of communication system resources in accordance with the principles of the present embodiment. In the tree structure, the number of physical resource blocks available for a particular communication system resource (e.g., bandwidth) is equal to the number of end nodes in the tree. This example shows six end tree nodes representing six physical resource blocks. Each physical resource blocks can have a bandwidth of 1.25 megahertz ("MHz") and a minimum physical resource block size of 12 subcarriers.

For a bandwidth of N=6 nodes, the tree depth equals N, and the total number of nodes in the tree equal N(N+1)/2. A node number can thus be signaled using ceil[log2(N*(N+1)/2)] bits. For a bandwidth of N nodes, the starting node 0 and the number of consecutive nodes P in the allocation can be signaled as an unsigned integer x as follows:

If $(P-1) \leq \left\lceil \frac{N}{2} \right\rceil$, then $x = N(P-1) + O$, else $x = N(N-(P-1)) + (N-1-O)$, which can be inverted with a simple decoding scheme at a receiver (e.g., of a device such as a user equipment) to recover the communication system parameters O and P.

To allocate end nodes, each user equipment is signaled a node number that maps to a set of end nodes representing physical resource blocks. Continuing the example, and referring again to FIG. 7, if a user equipment is allocated end nodes 0 and 1, then the user equipment is signaled "6." If a user equipment is allocated end nodes 2, 3 and 4, then the user equipment user is signaled "14." If a user equipment is allocated end node 5, then the user equipment is signaled "5." Even though a communication system resource allocation process can be either bitmap- or tree-based, a tree-based method is used as an exemplary framework for processes introduced herein. A similar approach can be employed for a bitmap-based process or otherwise. For a better understanding of the tree-based method, see 3GPP document TSG RAN WG1 Meeting #46bis, R1-062773, entitled "Uplink Resource Allocation for E-UTRA," (2006), which is incorporated herein by reference.

Figures 8A, 8B, 8C:
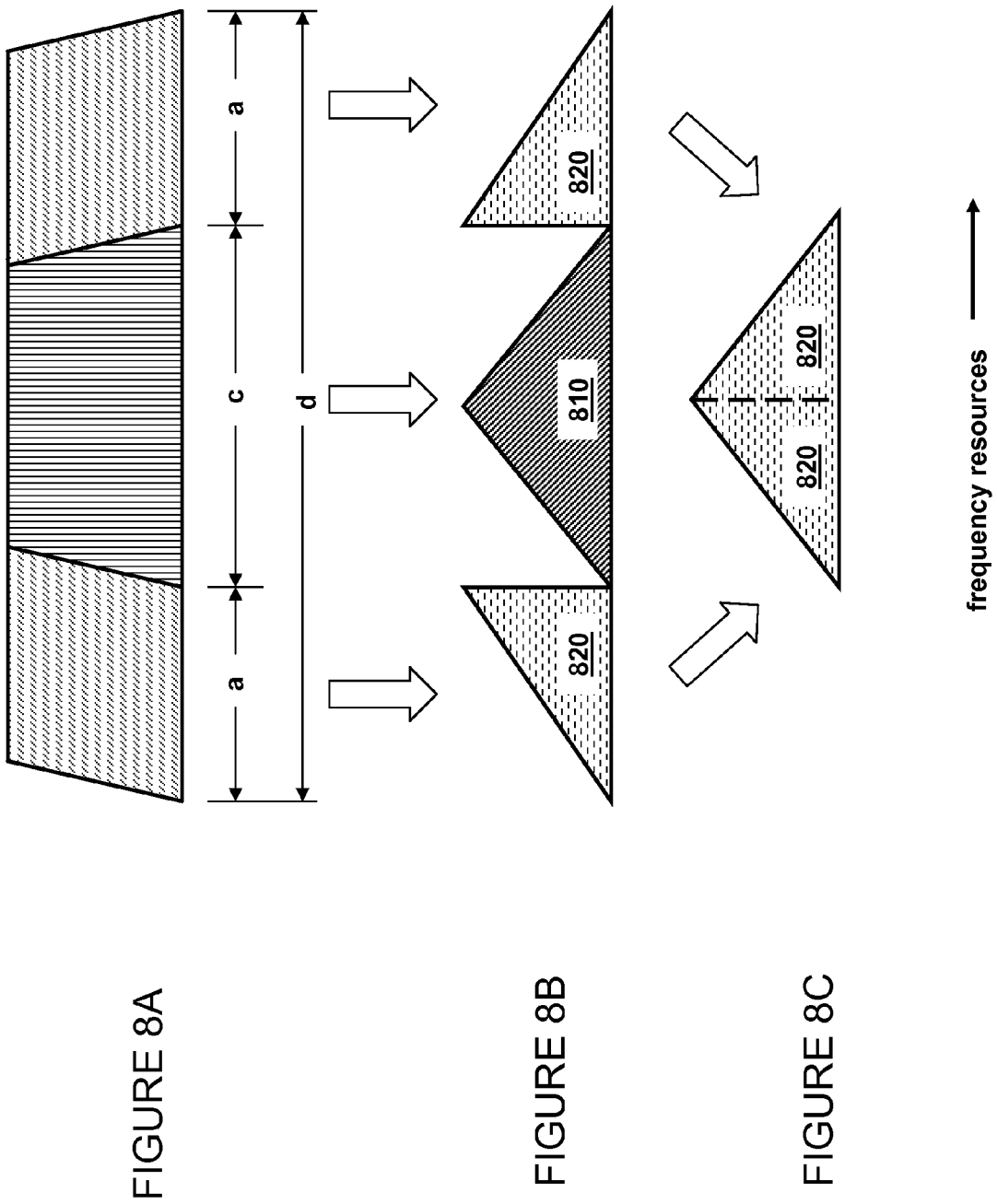
FIGS. 8A-8C illustrate graphical representations of an embodiment of a communication system resource allocation tree for secondary communication system resources in accordance with the principles of the present invention.

Turning now to FIGS. 8A-8C, illustrated are graphical representations of an embodiment of a communication system resource allocation tree (or resource allocation tree) for secondary communication system resources in accordance with the principles of the present invention. As introduced herein, the communication system resource allocation tree demonstrates an equal allocation of primary communication system resources (or bandwidth) and secondary communication system resources (or bandwidth). Since the actual bandwidth expressed in physical resource blocks that is used by the secondary communication system can be different from the primary communication system, the physical resource blocks for the secondary communication system resources may include a different number of subcarriers than for the primary communication system, wherein a physical resource block typically is about 12 subcarriers. As introduced herein, having the same number of primary and secondary communication system resources (e.g., in physical resource blocks), but with different subcarrier mappings enables efficient reuse of a communication system resource allocation employed for the primary communication system.

Beginning with FIG. 8A, illustrated is the graphical representation of FIG. 6 demonstrating exemplary primary communication system resources for a primary communication system. FIG. 8B illustrates a communication system resource allocation tree for the primary communication system resources 810 (used primary communication system resources or bandwidth) and the secondary communication system resources 820 (also unused primary communication system resources). FIG. 8C illustrates a communication system resource allocation tree for the secondary communication system resources 820. The top apex of the communication system resource allocation tree can be employed to describe a group of physical resource blocks as secondary communication system resources that may be employed by devices in a secondary communication system for, without limitation, direct device-to-device communication that need not pass through an intervening base station.

To differentiate between primary and secondary communication system resource allocations, a base station can transmit bandwidth grants with different radio network temporary identifiers. In the 3GPP LTE-based communication system, a specific radio network temporary identifier (a secondary communication system radio network temporary identifier) can be configured for the secondary communication system, and devices communicating with the secondary communication system resources decode that specific radio network temporary identifier to identify communication system resource allocations. Secondary communication is opportunistic by its nature, so multiple devices can be allocated the same resources and they will use, for example, contention-based channel access to reserve a secondary communication system resource from a base station for transmission.

Turning now to FIGS. 9A-9B, illustrated are graphical representations of an embodiment of a communication system resource allocation tree for secondary communication system resources in accordance with the principles of the present invention. FIG. 9A illustrates an allocation of primary communication system resources 910 (used primary communication system resources or bandwidth) and first, second and third secondary communication system resources 920, 930, 940, respectively (also unused primary communication system resources). FIG. 9B illustrates a communication system resource allocation tree for the first and second secondary communication system resources 920, 930, respectively. The third secondary communication system resources 940, however, remain unused.

As introduced herein, the resolution (e.g., in subcarriers per physical resource block or subcarrier separation (spacing)) of the secondary communication resources is a function of used primary communication system resources (or bandwidth) to the unused primary communication system resources (or bandwidth). In addition, the base station can configure a guard band between the used primary communication system resources and the unused primary communication system resources to be used for the secondary communication system resources. The guard bandwidth is taken into account when determining the resolution of the secondary communication system resources.

A communication system (e.g., a base station therein) may calculate the resolution in units of number of subcarriers per physical resource block ("D2D_resolution") as indicated below by equation (1), for 12 subcarriers per physical resource block:

$$D2D\_resolution = floor(((ubw) - 2 \times gb\_sc)/pbw\_prb) \quad \text{Equation (1)}$$

wherein, ubw=unused primary communication system resources (or bandwidth) in subcarriers, which represents the number of secondary communication system resources (or bandwidth) in subcarriers available for the secondary communication system. For example, 15 kilohertz ("kHz") subcarrier separation may be employed in the primary communication system;

gb_sc=guard band in subcarriers; and pbw_prb=number of physical resource blocks for the primary communication system resources.

The resulting separation of subcarriers in a secondary communication system (subcarrier spacing) may be calculated, assuming 15 kHz primary communication system subcarrier separation, as (D2D_resolution/12)·(15 kHz).

The equation above can result in unused primary communication system resources in subcarriers that may also be used as a guard band in the outer edges of the secondary communication system resources. The process introduced hereinabove can also be used in case the network changes the center frequency of the shrunk active carrier bandwidth (of the primary communication system) for some reason if knowledge of the center frequency of the deployment carrier center frequency is signaled to the secondary communication system, since the communication system resource allocation tree can still be generated for the unused part of the spectrum.

Referring now to TABLE 1, illustrated is an exemplary communication system configuration demonstrating an embodiment of the process for 10 MHz deployment (50 PRBs) with a one PRB guard-band configuration (gb=1 PRB).

TABLE 1

| Deployment BW (PRBs) | Deployment BW (subcarriers) | Primary System BW (PRBs) | Secondary System BW (PRBs) | Guard BW (PRBs) | Available BW for Secondary System (PRBs) | Secondary System BW (subcarriers) | Subcarriers per Secondary System PRB (subcarriers) | Leftover BW (subcarriers) |
|---|---|---|---|---|---|---|---|---|
| 50 | 600 | 50 | 0 | N/A | N/A | N/A | N/A | N/A |
| 50 | 600 | 25 | 25 | 1 | 23 | 276 | 11 | 1 |
| 50 | 600 | 15 | 35 | 1 | 33 | 396 | 23 | 6 |
| 50 | 600 | 6 | 44 | 1 | 42 | 504 | 84 | 0 |
| 25 | 300 | 25 | 0 | N/A | N/A | N/A | N/A | N/A |

TABLE 1 illustrates five exemplary deployments of bandwidth, represented in the first column by the entries of 50 and 25 PRBs. The second column illustrates the number of subcarriers that are deployed, and is obtained from the first column by multiplying by 12, the number of subcarriers per PRB. The number of PRBs actually employed for primary communication system resources (or bandwidth) is illustrated in the third column, which is an entry representing possible variations in system loading. The fourth column indicates the number of secondary communication system resources that are available, which is the first column minus the third column. The fifth column indicates the number of guard bands. If no PRBs are available for the secondary communication system bandwidth, the table entry is shown as "N/A." The sixth column shows the available bandwidth in PRBs for the secondary communication system, which is the fourth column minus twice the fifth column, the two representing two guard bands. The seventh column shows the available bandwidth (or secondary communication system resources) measured in subcarriers for the secondary communication system, which is given by the seventh column entries times 12. The eighth column shows the number of subcarriers assigned per secondary communication system resources (in PRBs), which is the integer part of the seventh column entry divided by the third column entry. The ninth column shows unused secondary communication system resources (or bandwidth) in subcarriers, which is the seventh column entry minus the eighth column entry times the third column entry.

The following example of a calculation of D2D_resolution from equation (1) uses the second row from TABLE 1.
ubw=25×12=300, (the primary communication system uses one half of the deployment bandwidth),
gb_sc=12, and
pbw_prb=50.
This results in $$D2D\_resolution=floor((300-2\times 12)/25)=11,$$

plus one additional left-over subcarrier, which devices may use to interpret as an additional guard band subcarrier.

Figure 10:
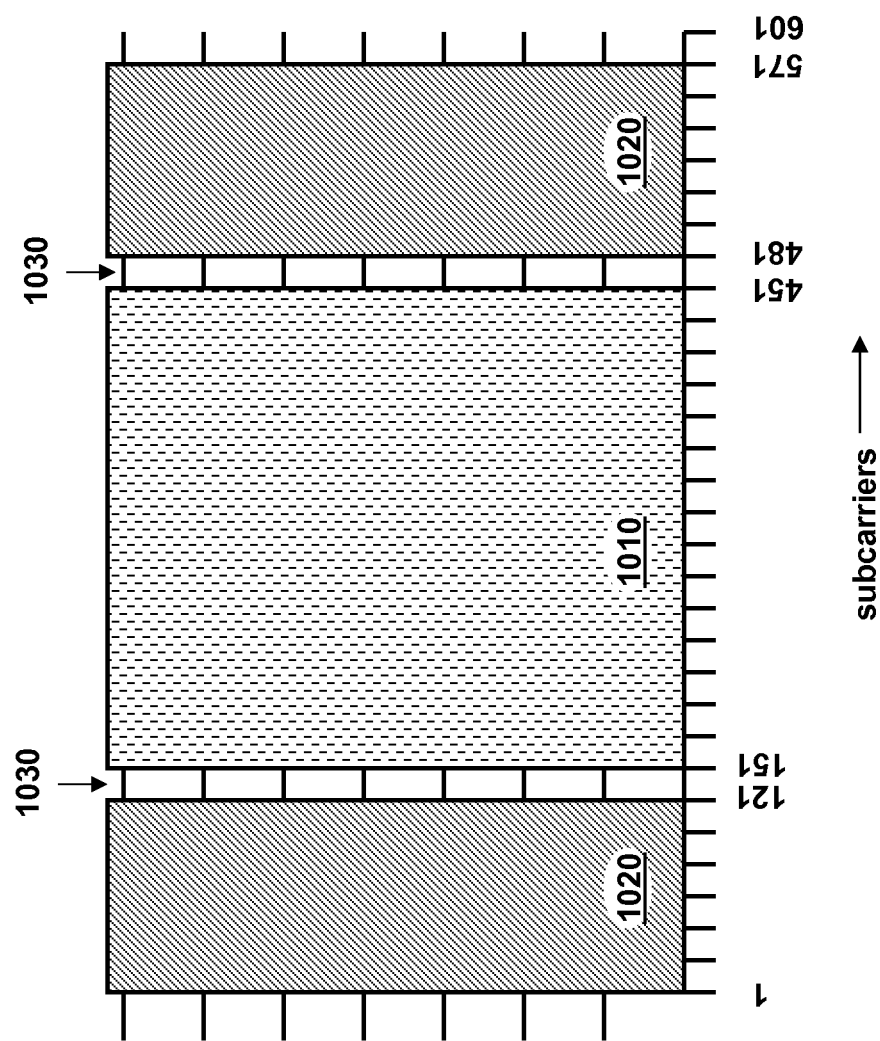
FIG. 10 illustrates a graphical representation of an exemplary communication system resource division between primary and secondary communication system resources as a function of subcarrier indices according to the principles of the present invention.

Turning now to FIG. 10, illustrated is a graphical representation of an exemplary communication system resource division between primary and secondary communication system resources as a function of subcarrier indices according to the principles of the present invention. The illustrated embodiment employs selected communication system parameters introduced in TABLE 1. The horizontal axis represents subcarrier number and, as in FIG. 6, the vertical axis represents a general communication system parameter such as a transmitted power level. The primary communication system resources (or bandwidth) 1010 and secondary communication system resources (or bandwidth) 1020 are illustrated with guard bands 1030 of 30 subcarriers therebetween. In order to keep the scheduling complexity low, the primary and secondary communication system resources 1010, 1020 have equal numbers of PRBs. FIG. 10 illustrates a bandwidth division of 50 PRBs between the primary and secondary communication system resources 1010, 1020, wherein 25 PRBs are deployed for primary communication system resources 1010 and 25 PRBs are deployed for secondary communication system resources 1020. This allows a base station to use the same tree structure to allocate communication system resources. The difference is that now for secondary communication system resources 1020, the PRBs are possibly mapped to a different number of subcarriers.

In an LTE-based communication system, one PRB includes of 12 subcarriers, while the number of subcarriers per PRB for the secondary communication system resources 1020 depends on the primary communication system resources (e.g., the number of used carriers). Since the communication system resource allocation is kept simple, the same number of PRBs is configured for secondary communication system resources 1020, but now the guard band is also taken into account. The guard band bandwidth can be dynamically configured by the communication system. In this example, two PRBs are used for guard band bandwidth. Accordingly, the PRBs for the secondary communication system resources 1020 include 10 sub carriers.

Thus, as introduced herein, a communication system resource allocation method and signaling allows a base station to allocate secondary communication system resources as a function of the unused primary communication system resources using the same communication system resource allocation signaling as for primary communication system. As a result, there is no need to modify LTE Release-8 communication system resource allocation signaling to facilitate communication within the secondary communication system within an LTE spectrum. With base station based communication system resource allocation as introduced herein, devices in the secondary communication system can more easily avoid overlapping selection of communication system resources.

Figure 11:
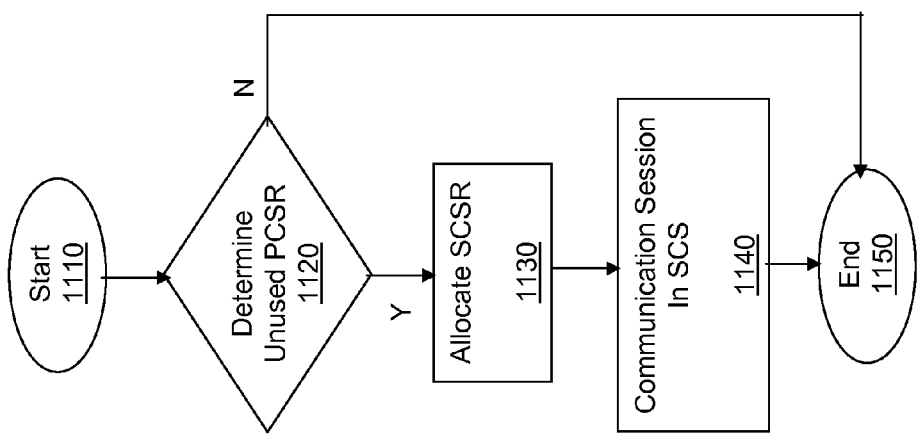
FIG. 11 illustrates a flow diagram of an embodiment of a method of operating a communication system in accordance with the principles of the present invention.

Turning now to FIG. 11, illustrated is a flow diagram of an embodiment of a method of operating a communication system in accordance with the principles of the present invention. Following a start step or module 1110, a communication system (e.g., a base station therein) determines unused primary communication system resources ("PCSR") in a primary communication system for secondary communication system resources in a step or module 1120. If the communication system determines that unused primary communication system resources are available, then the method allocates the secondary communication system resources ("SCSR") on a control channel of the primary communication system to a secondary communication system to enable communication with a device therein in a step or module 1130.

The secondary communication system resources may be allocated according to an allocation (e.g., tree-based or bitmap-based) of communication system resources of the primary communication system. Also, the secondary communication system resources may be allocated to the device employing a different radio network temporary identifier than an allocation of a primary communication system resource to the device. The secondary communication system resources may also be allocated with guard bands thereabout. A resolution of the secondary communication resources in units of subcarriers per physical resource block (or subcarrier separation (spacing)) of the primary communication system is a function of used primary communication system resources to the unused primary communication system resources.

Once the device (e.g., user equipment, machine, home base station) is allocated the secondary communication system resources, a communication session is enabled in the secondary communication system ("SCS") in a step or module 1140. The communication session may be, without limitation, a device-to-device, machine-to-machine, home base station to user equipment, etc. communication session. Once the communication session is complete, the method ends at step or module 1150. Additionally, if the communication system determines that unused primary communication system resources are not available, then the method ends at step or module 1150.

Thus, an apparatus, method and system are introduced herein for dynamic resolution of secondary communication system resources for communications in a communication system. In one embodiment, an apparatus (e.g., a device such as user equipment, machine or home base station) includes a processor and memory including computer program code. The memory and the computer program code are configured to, with the processor, cause the apparatus to receive an allocation of secondary communication system resources on a control channel of a primary communication system to enable communication in a secondary communication system. The secondary communication system resources are a function of unused primary communication system resources in the primary communication system. A resolution of the secondary communication resources in units of subcarriers per physical resource block (or subcarrier separation (spacing)) of the primary communication system may be a function of used primary communication system resources to the unused primary communication system resources. The allocation of the secondary communication system resources may be according to an allocation (e.g., tree-based or bitmap-based) of communication system resources of the primary communication system. The allocation of the secondary communication system resources may be provided with a different radio network temporary identifier than an allocation of a primary communication system resource. Also, the allocation of the secondary communication system resource may be provided with guard bands thereabout.

In another embodiment, an apparatus (e.g., base station) includes memory and computer program code configured to, with a processor, cause the apparatus to determine unused primary communication system resources in a primary communication system for secondary communication system resources, and allocate the secondary communication system resources on a control channel of the primary communication system to a secondary communication system to enable communication with a device (e.g., a user equipment, machine and home base station) therein. The resolution of the secondary communication resources in units of subcarriers per physical resource block (or subcarrier separation (spacing)) of the primary communication system is a function of used primary communication system resources to the unused primary communication system resources. The apparatus is configured to allocate the secondary communication system resources according to an allocation (e.g., tree-based or bitmap-based) of communication system resources of the primary communication system. The apparatus is configured to allocate the secondary communication system resources to the device employing a different radio network temporary identifier than an allocation of a primary communication system resource to the device. The apparatus is configured to allocate the secondary communication system resources with guard bands thereabout. As an example, when the device is a home base station, the apparatus is configured to allocate the secondary communication system resources on the control channel of the primary communication system to the home base station of the secondary communication system to enable communication between user equipment therein. Although the apparatus, method and system described herein have been described with respect to cellular-based communication systems, the apparatus and method are equally applicable to other types of communication systems such as a WiMax® communication system.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a processor; and
memory including computer program code,
said memory and said computer program code configured to, with said processor, cause said apparatus to perform at least the following:
receive an allocation of secondary communication system resources on a control channel of a primary communication system to enable communication in a secondary communication system, wherein said secondary communication system resources are a function of unused primary communication system resources in said primary communication system, and wherein a resolution of said secondary communication resources in units of subcarriers per physical resource block of said primary communication system is a function of unused primary communication system resources to said used primary communication system resources.

2. The apparatus as recited in claim 1 wherein said allocation of said secondary communication system resources is according to an allocation of communication system resources of said primary communication system.

3. The apparatus as recited in claim 1 wherein said allocation of said secondary communication system resources is provided with a different radio network temporary identifier than an allocation of a primary communication system resource.

4. The apparatus as recited in claim 1 wherein said allocation of said secondary communication system resource is provided with guard bands.

5. A method comprising:
receiving an allocation of secondary communication system resources on a control channel of a primary communication system to enable communication in a secondary communication system, wherein said secondary communication system resources are a function of unused primary communication system resources in said primary communication system, and wherein a resolution of said secondary communication resources in units of subcarriers per physical resource block of said primary communication system is a function of unused primary communication system resources to said used primary communication system resources.

6. The method as recited in claim 5 wherein said allocation of said secondary communication system resources is according to an allocation of communication system resources of said primary communication system.

7. The method as recited in claim 5 wherein said allocation of said secondary communication system resources is provided with a different radio network temporary identifier than an allocation of a primary communication system resource.

8. The method as recited in claim 5 wherein said allocation of said secondary communication system resource is provided with guard bands.

9. An apparatus comprising:
a processor; and
memory including computer program code,
said memory and said computer program code configured to, with said processor, cause said apparatus to perform at least the following:
determine unused primary communication system resources in a primary communication system for secondary communication system resources, and
allocate said secondary communication system resources on a control channel of said primary communication system to a secondary communication system to enable communication with a device therein, wherein said secondary communication system resources are a function of unused primary communication system resources in said primary communication system, and wherein a resolution of said secondary communication resources in units of subcarriers per physical resource block of said primary communication system is a function of unused primary communication system resources to said used primary communication system resources.

10. The apparatus as recited in claim 9 wherein said memory and said computer program code are configured to, with said processor, cause said apparatus to allocate said secondary communication system resources according to an allocation of communication system resources of said primary communication system.

11. The apparatus as recited in claim 9 wherein said memory and said computer program code are configured to, with said processor, cause said apparatus to allocate said secondary communication system resources to said device employing a different radio network temporary identifier than an allocation of a primary communication system resource to said device.

12. The apparatus as recited in claim 9 wherein said memory and said computer program code are configured to, with said processor, cause said apparatus to allocate said secondary communication system resources with guard bands.

13. A method comprising:
determining unused primary communication system resources in a primary communication system for secondary communication system resources, and
allocating said secondary communication system resources on a control channel of said primary communication system to a secondary communication system to enable communication with a device therein, wherein said secondary communication system resources are a function of unused primary communication system resources in said primary communication system, and wherein a resolution of said secondary communication resources in units of subcarriers per physical resource block of said primary communication system is a function of unused primary communication system resources to said used primary communication system resources.

14. The method as recited in claim 13 wherein said allocating comprises allocating said secondary communication system resources according to an allocation of communication system resources of said primary communication system.

15. The method as recited in claim 13 wherein said allocating comprises allocating said secondary communication system resources to said device employing a different radio network temporary identifier than an allocation of a primary communication system resource to said device.

16. The method as recited in claim 13 wherein said allocating comprises allocating said secondary communication system resources with guard bands.

* * * * *